(12) United States Patent
Chen et al.

(10) Patent No.: US 11,929,601 B2
(45) Date of Patent: Mar. 12, 2024

(54) WIRING DEVICE AND COMPRESSOR

(71) Applicant: SHANGHAI HIGHLY ELECTRICAL APPLIANCES CO., LTD., Shanghai (CN)

(72) Inventors: Yanchun Chen, Shanghai (CN); Wei Geng, Shanghai (CN)

(73) Assignee: SHANGHAI HIGHLY ELECTRICAL APPLIANCES CO., LTD., Shanghai (CN)

( * ) Notice: Subject to any disclaimer, the term of this patent is extended or adjusted under 35 U.S.C. 154(b) by 334 days.

(21) Appl. No.: 17/423,483

(22) PCT Filed: Dec. 30, 2019

(86) PCT No.: PCT/CN2019/129934
§ 371 (c)(1),
(2) Date: Jul. 16, 2021

(87) PCT Pub. No.: WO2021/008091
PCT Pub. Date: Jan. 21, 2021

(65) Prior Publication Data
US 2022/0077667 A1   Mar. 10, 2022

(30) Foreign Application Priority Data

Jul. 15, 2019   (CN) .......................... 201921104245.3

(51) Int. Cl.
*H02G 3/18* (2006.01)
*H01R 9/24* (2006.01)
(Continued)

(52) U.S. Cl.
CPC ............... *H02G 3/081* (2013.01); *H01R 9/24* (2013.01); *H02G 3/18* (2013.01); *H01R 11/11* (2013.01)

(58) Field of Classification Search
CPC ...................................................... H02G 3/18
See application file for complete search history.

(56) References Cited

U.S. PATENT DOCUMENTS 5,199,898 A    4/1993  Wisner
6,290,528 B1   9/2001  Moore, Jr.
(Continued)

FOREIGN PATENT DOCUMENTS

CN   207517913   6/2018
CN   109510001   3/2019
(Continued)

*Primary Examiner* — Hung V Ngo
(74) *Attorney, Agent, or Firm* — Winston Hsu

(57) ABSTRACT

A wiring device includes a junction box cover, a wiring spacer, and a seal terminal. The wiring device is disposed on a housing cover of a compressor. The junction box cover is disposed on the junction spacer and forms a cavity space, and the cavity space is provided with a wiring opening at the end away from the seal terminal. The seal terminal is provided with 3 wiring columns; each wiring column is connected to a piece of connector along the extending direction of the wiring column away from the housing cover; and the connector all extend in the direction close to the wiring opening so that the outgoing directions of lead wires are consistent. The present structure enables the lead wires to go out smoothly so as to improve production efficiency.

8 Claims, 3 Drawing Sheets

(51) Int. Cl.
*H02G 3/08* (2006.01)
*H01R 11/11* (2006.01)

(56) References Cited

U.S. PATENT DOCUMENTS

| | | |
|---|---|---|
| 6,779,989 B2 | 8/2004 | Makino |
| 9,979,118 B2 | 5/2018 | Khadkikar |
| 2006/0275156 A1 | 12/2006 | Ogawa |
| 2013/0330217 A1 | 12/2013 | Enami |
| 2020/0032792 A1 * | 1/2020 | Mizuguchi ............. H02K 5/225 |

FOREIGN PATENT DOCUMENTS

| | | |
|---|---|---|
| CN | 208608414 U | 3/2019 |
| CN | 109921546 | 6/2019 |
| CN | 208986208 | 6/2019 |
| CN | 208986550 | 6/2019 |
| CN | 209100228 | 7/2019 |
| JP | 58-191648 U | 12/1983 |
| JP | 60-111272 U | 7/1985 |
| JP | 2000-274365 A | 10/2000 |
| JP | 2008-202538 A | 9/2008 |
| JP | 2009-236065 A | 10/2009 |
| JP | 2019-35394 A | 3/2019 |
| WO | 2018/194106 A1 | 10/2018 |

* cited by examiner

WIRING DEVICE AND COMPRESSOR

BACKGROUND OF THE INVENTION

1. Field of the Invention

The present application relates to the field of external units of air conditioners and, in particular, to a wiring device and a compressor.

2. Description of the Prior Art

Existing wiring devices for compressors are usually structured as shown in FIG. 1 or 2, in which wiring posts on a seal terminal are distributed circumferentially along inner space of the seal terminal. For such structures, there are generally two wiring approaches. In the first wiring approach, the R wire is partially wound around the seal terminal, and the C wire has to be flexed, before they can be led out. In the second wiring approach, both the R and C wires are partially wound around the seal terminal before they can be led out. Both these approaches require to neaten wires and to determine routing directions of wires, which significantly affects production pace, and causes the stripping off of insulating sleeves from the wiring posts in the case of an improper routing. Moreover, the inconsistency of outgoing directions of the three wires may cause uneven forces applied to the wiring posts on the seal terminal. Further, in the second approach, in which the three wires are wound on the same side, the thickness of wires on this side may increases, so that it is easy for the wiring box cover to press wires. All of these tend to create safety hazards.

Therefore, there is a need for a wiring device free of such safety hazards.

SUMMARY OF THE INVENTION

An object of present application is to provide a wiring device that is capable of solving the problem that two wiring approaches employed in the conventional wiring devices are required to neaten wires and to determine routing directions of wires, which significantly affects production pace, and causes the stripping off of insulating sleeves from the wiring posts in the case of an improper routing.

To solve the above problem, a first aspect of present application provides a wiring device, which includes a wiring box cover, a wiring spacer and a seal terminal and is disposed on a case of a compressor.

The wiring box cover is disposed over the wiring spacer and delimits a cavity. The seal terminal is disposed within the cavity and attached to the wiring spacer, and the cavity is provided with a wiring opening at an end of the cavity away from the seal terminal. The wiring opening is configured as an outlet of wires.

The seal terminal is provided with three wiring posts, each wiring post connected to a respective one of sheet connectors, along an extending direction of a respective wiring post away from the case, where the sheet connectors are a first connector, a second connector and a third connector.

Each of the first connector, the second connector and the third connector extends toward the wiring opening and has an end extending toward the wiring opening to be configured for a connection with a respective one of wires.

The wires connected to a respective one of the first connector, the second connector and the third connector have consistency in outgoing directions of the wires.

Optionally, the seal terminal has a first point a that is equidistant from the three wiring posts by a straight-line distance, and the wiring box cover has an end at the wiring opening being open end. The open end is projected onto the case along a direction perpendicular to a first plane to define a line segment m. The line segment m has a midpoint defined as a second point c, and the first plane is a plane where the seal terminal lies.

The line segment m has a perpendicular bisector that is defined as a first line in the first plane, and a line passing through the first point a in a direction perpendicular to the first line is defined as a second line. A third line is formed by passing through both the first point a and the second point c. The first line intersects the second line at a third point d. The straight-line distance from the first point a to the third point d is defined as a first distance H, and the straight-line distance from the second point c to the third point d is defined as a second distance L.

The first connector is projected along the direction perpendicular to the first plane to define a first projecting line. The second connector is projected along the direction perpendicular to the first plane to define a second projecting line, and the third connector is projected along the direction perpendicular to the first plane to define a third projecting line.

The first projecting line and the third line form an angle defined as a first angle $\alpha$ in the range of $[0\%\ \arctan(H/L)]$.

Optionally, the second projecting line and the third line form an angle defined as a second angle $\beta$ in the range of $[0°, \arctan(L/H)]$.

Optionally, the third projecting line and the third line form an angle defined as a third angle $\gamma$ in the range of $[\arctan(H/L), \arctan(L/H)]$.

Optionally, the sheet connectors are metal sheets.

Optionally, the wiring device further includes a fastener configured to fasten the wiring device to the case.

Optionally, the fastener includes a nut and a screw, which work together to fasten the wiring device to the case.

Optionally, a plurality of fasteners are provided.

A second aspect of present application provides a compressor comprising a wiring device having any of above-mentioned features.

The present application proposes a wiring device and a compressor. The wiring device includes a wiring box cover, a wiring spacer and a seal terminal and is disposed on a case of the compressor. The seal terminal is provided with three wiring posts, each wiring post connected to a respective one of sheet connectors, along an extending direction of a respective wiring post away from the case, where the sheet connectors are a first connector, a second connector and a third connector. Each of the first connector, the second connector and the third connector extends toward the wiring opening to result in a consistency of outgoing directions of wires. The structure proposed in present application enables wires to go out smoothly so as to enhance production efficiency. The consistency of outgoing directions of three wires allows achieving even forces applied to the wiring posts on the seal terminal without safety hazards. Moreover, the consistency of outgoing directions enables to avoid local wiring and wire stacking, so as to achieve a reasonable arrangement within inner space of wiring box cover, which further improves the safety of the device.

These and other objectives of the present invention will no doubt become obvious to those of ordinary skill in the art after reading the following detailed description of the preferred embodiment that is illustrated in the various figures and drawings.

Figure 1:
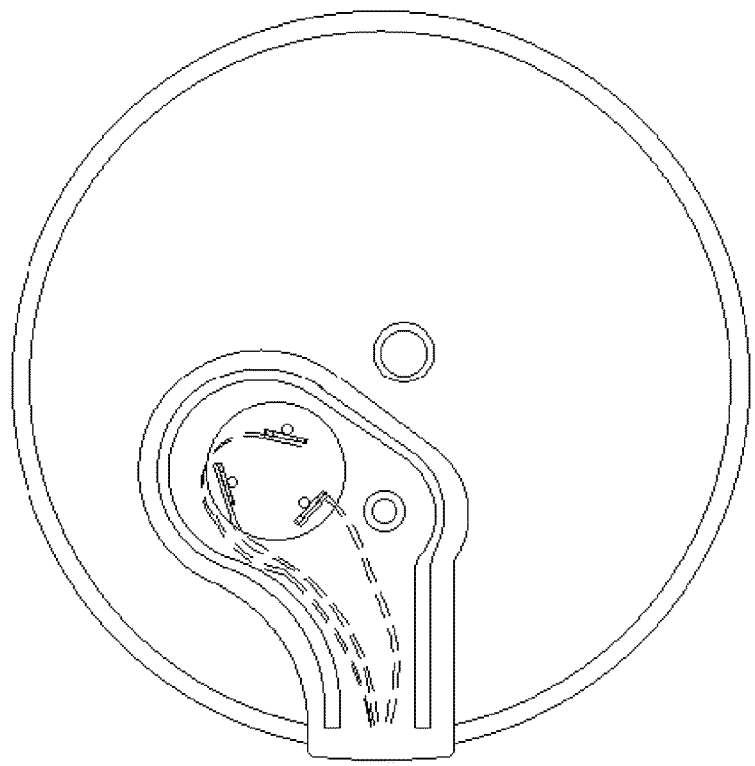
FIG. 1 shows a wiring approach of the prior art.
Figure 2:
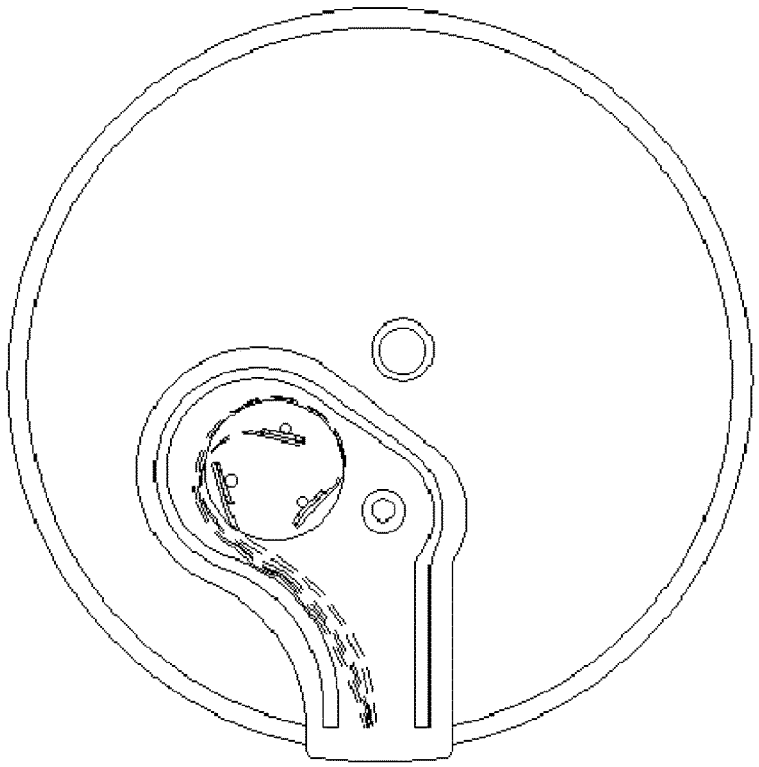
FIG. 2 shows another wiring approach of the prior art.

In the figures: 10—wiring box cover; 20—wiring spacer; 30—seal terminal; 301—wiring post; 3011—first connector; 3012—second connector; 3013—third connector; 40—case; 50—wire; 60—fastener; 70—first line; 80—second line; 90—third line.

DETAILED DESCRIPTION

Wiring devices and compressors according to present application will be described in greater detail below with reference to the appended schematic drawings. Features and advantages of present application will be more apparent from the following detailed description and claims. Note that the accompanying drawings are provided in a very simplified form not necessarily presented to scale and are intended merely to facilitate convenience and clarity in explaining the embodiments.

As used herein, the terms "central", "upper", "lower", "left", "right" and the like indicating the orientation or positional relationship are based on the orientation or positional relationship shown in the drawings. They are intended merely to facilitate and simplify the description of the present application and do not indicate or imply that the indicated components or elements have to assume, or be constructed or operated in, particular orientations. Therefore, they are not to be construed as limiting the application.

In addition, the terms "first", "second", etc. are used herein only for the purpose of illustration and are not to be construed as indicating or implying relative importance or implicitly indicating the number of the indicated features. Therefore, a feature described with "first", "second" or the like can explicitly or implicitly indicate the presence of one or more such features. As used herein, the term "plurality" has the meaning of "at least two", e.g., two, three or more, unless the context clearly indicates otherwise.

Figure 3:
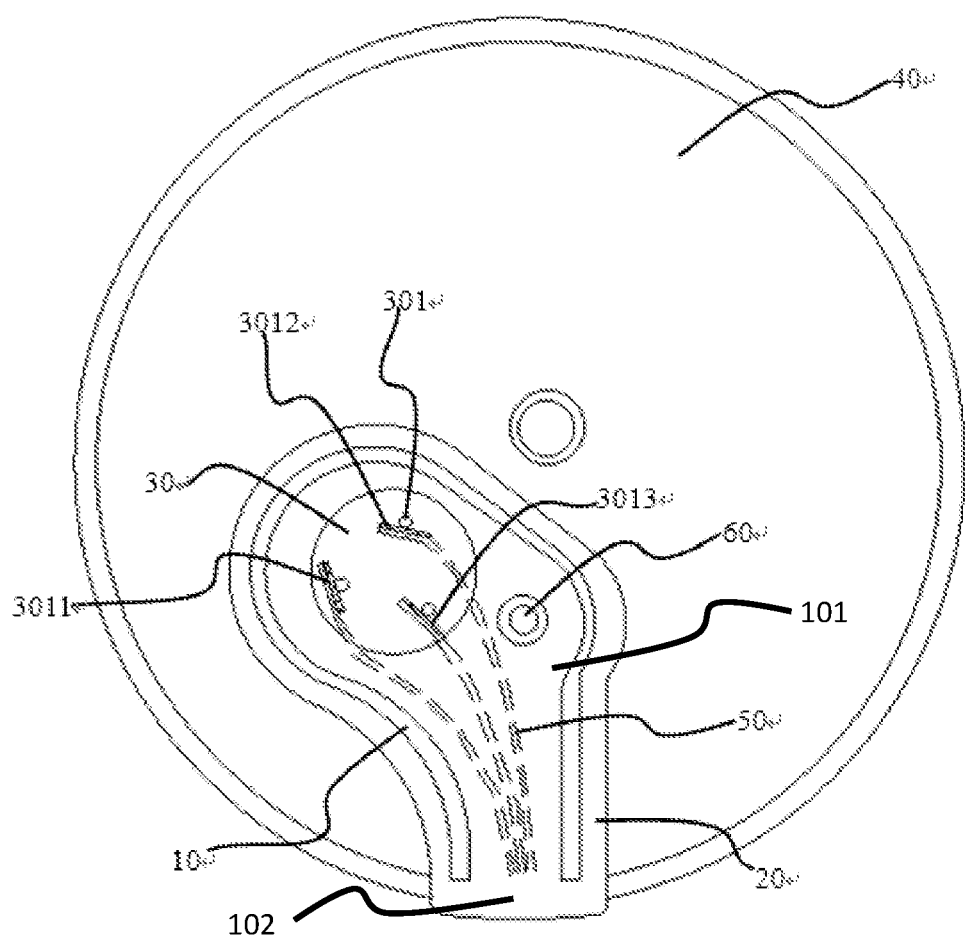
FIG. 3 is a structural schematic of a wiring device according to embodiments of present application.
Figure 4:
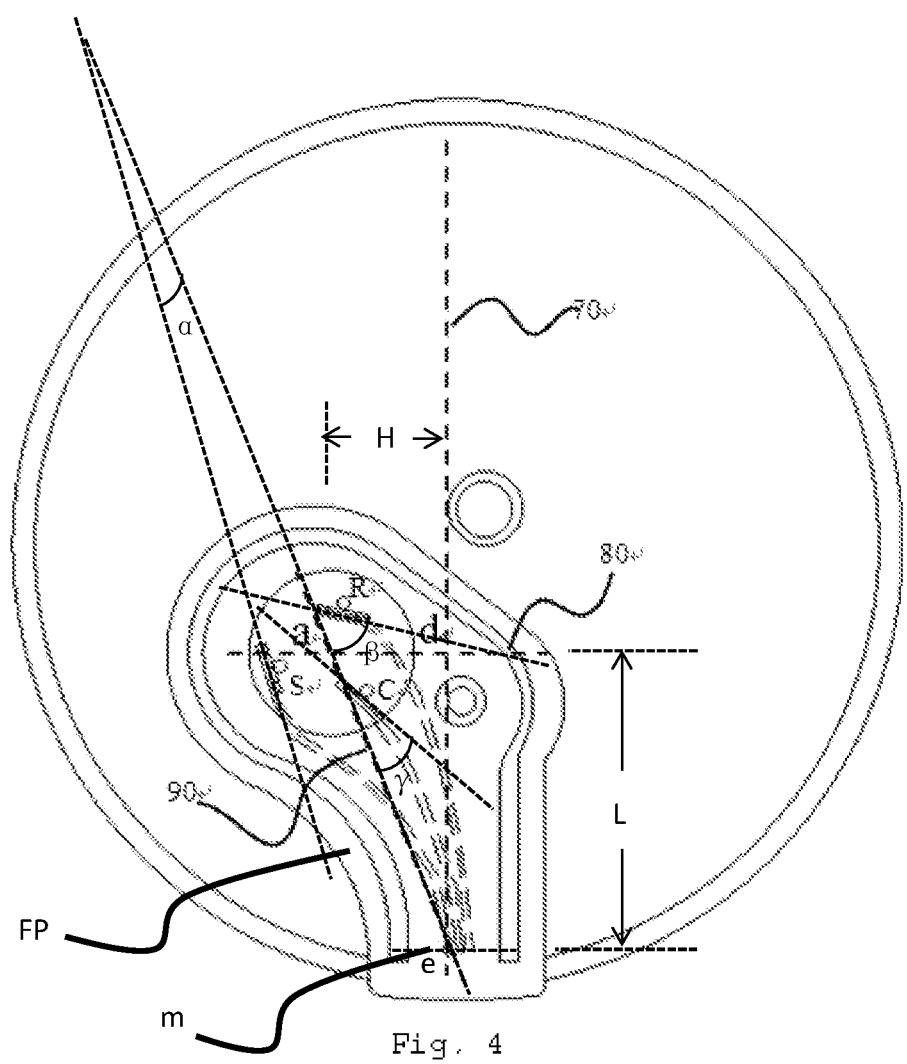
FIG. 4 is a schematic diagram of auxiliary lines in the structure of a wiring device according to embodiments of present application.

As shown in FIGS. 3 and 4, a wiring device according to an embodiment of the present application includes a wiring box cover 10, a wiring spacer 20 and a seal terminal 30, and is disposed on a case 40 of the compressor. The wiring box cover 10 is disposed over the wiring spacer 20 and delimits a cavity 101. The seal terminal 30 is disposed within the cavity 101 and connected to the wiring spacer 20. The cavity 101 is provided with a wiring opening 102 at an end of the cavity 101 away from the seal terminal 30. The wiring opening 102 is configured as an outlet of wires 50. Three wiring posts 301 are arranged on the seal terminal 30. Each wiring post 301 is connected to a respective one of sheet connectors, along an extending direction of a respective wiring post 301 away from the case 40. The sheet connectors are a first connector 3011, a second connector 3012 and a third connector 3013. Each of the first, second and third connectors 3011, 3012 and 3013 is in a plane that extends toward the wiring opening 102. In other words, each of the first, second and third connectors 3011, 3012 and 3013 extends toward the wiring opening 102, and the end of each of the first, second and third connectors 3011, 3012 and 3013 extending toward the wiring opening 102 is configured to connect with a respective one of the wires. Wires connected to a respective one of the first, second and third connectors 3011, 3012 and 3013 have consistency in wire outgoing directions.

In the wiring device according to this embodiment of the present application, the S, R and C pins on the seal terminal 30, i.e., the first, second and third connectors 3011, 3012 and 3013, are all oriented toward the wiring opening 102. Such structural design allows the wires 50 to be routed out smoothly without any winding or flexing, thus helping in improving production efficiency. As shown in FIG. 3, outgoing directions of the three wires are consistent. This enables uniform stress on the three wiring posts 301, avoiding safety hazards that may arising from uneven stressing of the wiring posts 301. Further, the consistency of outgoing directions enables to avoid local wiring and wire stacking, so as to achieve a reasonable arrangement within inner space of wiring box cover, which further improves the safety of the device.

According to embodiments of the present application, the first, second and third connectors 3011, 3012 and 3013 are respectively connected to the three wiring posts 301 by welding. According to other embodiments of the present application, the first, second and third connectors 3011, 3012 and 3013 may be respectively connected to the three wiring posts 301 by detachable attaching, for example, by snapping.

Preferably, the first, second and third connectors 3011, 3012 and 3013 are located on the same side of the respective wiring posts 301 to which they are connected. In this way, easier connection of the wires can be achieved. As shown in FIG. 3, in embodiments of the present application, the first, second and third connectors 3011, 3012 and 3013 are all located on the (substantially) left side of the respective wiring posts 301. Further, each of the first and second connectors 3011, 3012 has a first end close to the third connector 3013 and a second end away from the third connector 3013. In this case, the first end of the first connector 3011 is away from the first end of the second connector 3012, with the second end of the first connector 3011 being close to the second end of the second connector 3012. Alternatively, the distance between the second end of the first connector 3011 and the second end of the second connector 3012 is shorter than the distance between the first end of the first connector 3011 and the first end of the second connector 3012. As such, the first and second connectors 3011, 3012 may together assume a generally splayed shape, which is conducive to easier wire connections.

Further, there may be a point a on a base of the seal terminal 30, which is equidistant from the three wiring posts by the same straight-line distance. The end of the wiring box cover 10 at the wiring opening 102 is defined as the open end. The projection of the open end on the case 40 along a direction perpendicular to a first plane FP defines a line segment m. The line segment m has a midpoint e, and the first plane FP is a plane where the seal terminal 30 on the case 40 lies. The perpendicular bisector of the line segment m in the first plane FP is defined as a first line 70. The line passing through the first point a along the direction perpendicular to the first line is defined as a second line 80. The line passing through both the first point a and the second point e is defined as a third line 90. The first line 70 intersects the second line 80 at a point d. The straight-line distance from the first point a to the third point d is defined as a first distance H, and the straight-line distance from the second point e to the third point d is defined as a second distance L. It is to be noted that, in this embodiment, projections of the wiring posts 301 on the first plane FP is a circle, and the point a is located at the position equidistant to centers of the three circles of projections. However, in the cases that the projections of the wiring posts 301 are not circular, it is necessary to locate the point a at the position equidistant to centers of projections of three wiring posts 301 on the first plane FP.

Along the direction perpendicular to the first plane FP, the first connector 3011 has a first projecting line, the second connector 3012 having a second projecting line, the third connector 3013 having a third projecting line. The first projecting line and the third line 90 form an angle defined as a first angle α in the range of [0°, arctan(H/L)]. That is, the first connector 3011 on the S wiring post form an angle defined as a first angle α in the range of [0°, arctan(H/L)] with respect to the third line 90. Such angular range of the first connector 3011 on the S wiring post enables to ensure that the first connector 3011 on the S wiring post is oriented toward the wiring opening 102. Of course, this range may be finely tuned according to practical requirements of the compressor.

In order to limit the extension of the R wiring post in a direction orienting the wiring opening 102, the second projecting line and the third line 90 form an angle defined as a second angle β in the range of [0°, arctan(L/H)]. That is, the second connector 3012 on the R wiring post and the third line 90 form an angle defined as a second angle β in the range of [0°, arctan(L/H)]. Such angular range of the second connector 3012 on the R wiring post enables to ensure that the second connector 3012 on the R wiring post is oriented toward the wiring opening 102. Of course, this range may be finely tuned according to practical requirements of the compressor.

Similarly, in order to limit the extension of the C wiring post in a direction orienting toward the wiring opening 102, the third projecting line and the third line 90 form an angle defined as a third angle γ in the range of [arctan(H/L), arctan(L/H)]. That is, the third connector 3013 on the C wiring post form an angle defined as a third angle γ in the range of [arctan(H/L), arctan(L/H)] with respect to the third line 90. Such angular range of the third connector 3013 on the C wiring post enables to ensure that the third connector 3013 on the C wiring post is oriented toward the wiring opening 102. Of course, this range may be finely tuned according to practical requirements of the compressor.

It is to be noted that, according to embodiments of the present application, the sheet connectors may be chosen as metal sheets. Of course, the connectors are not limited to sheets made of metals, and they can be implemented as sheets made of any suitable conductive material. In practical applications, the material can be chosen as actually needed.

Optionally, the wiring device further includes a fastener 60 for fastening the wiring device to the case 40. The fastener 60 may include a nut and a screw, which are used in combination to fasten the wiring device to the case 40. More than one fastener 60 may be provided. The cooperation of a plurality of fasteners 60 enables to achieving a more stable wiring device.

Embodiments of present application also propose a compressor including the wiring device having any of above-mentioned features.

In summary, the present application proposes a wiring device and a compressor. The wiring device includes a wiring box cover, a wiring spacer and a seal terminal and is disposed on a case of the compressor. The seal terminal is provided with three wiring posts, each wiring post connected to a respective one of sheet connectors, along an extending direction of a respective wiring post away from the case, where the sheet connectors are a first connector, a second connector and a third connector. Each of the first connector, the second connector and the third connector extends toward the wiring opening 102 to result in a consistency of outgoing directions of wires. The structure proposed in present application enables wires to go out smoothly so as to enhance production efficiency. The consistency of outgoing directions of three wires allows achieving even forces applied to the wiring posts on the seal terminal without safety hazards. Moreover, the consistency of outgoing directions enables to avoid local wiring and wire stacking, so as to achieve a reasonable arrangement within inner space of wiring box cover, which further improves the safety of the device.

In the description of this specification, descriptions with reference to the terms "one embodiment", "some embodiments", "an embodiment" or "a specific embodiment" etc. mean that specific features, structures, materials or characteristics described in conjunction with the embodiments or examples are included in at least one embodiment or example of the present application. In this specification, the schematic expression of the above terms throughout this specification is not necessarily referring to the same embodiment or example. Moreover, the particular features, structures, materials, or characteristics described may be combined in any suitable manner in one or more embodiments. Further, various embodiments or examples may be jointed or combined by those of ordinary skill in the art.

The above are merely a few preferred embodiments of present application, which do not limit the application in any way. Any person skilled in the art, without departing from the scope of technical solutions of present application, can make any form of equivalent replacements or modifications or other changes to the technical solutions and technical content disclosed by present application. These equivalent replacements or modifications do not depart from the technical solution of present application and still falls within the protection scope of present application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wiring device for a compressor, wherein the wiring device comprises a wiring box cover, a wiring spacer and a seal terminal, and is disposed on a case of the compressor, wherein:

the wiring box cover is disposed over the wiring spacer and delimits a cavity, wherein the seal terminal is disposed within the cavity and attached to the wiring spacer, and the cavity is provided with a wiring opening at an end of the cavity away from the seal terminal, the wiring opening configured as an outlet of wires;

the seal terminal is provided with three wiring posts, each wiring post connected to a respective one of sheet connectors, along an extending direction of a respective wiring post away from the case, wherein the sheet connectors are a first connector, a second connector and a third connector;

each of the first connector, the second connector and the third connector extends toward the wiring opening and has an end extending toward the wiring opening to be configured for connection with a respective one of wires; and the wires connected to a respective one of the first connector, the second connector and the third connector have consistency in outgoing directions of the wires;

wherein the seal terminal has a first point that is equidistant from the three wiring posts by a straight-line distance, and the wiring box cover has an end at the wiring opening being open end, wherein the open end is projected onto the case along a direction perpendicular to a first plane to define a line segment m, the line segment m having a midpoint defined as a second point, the first plane being a plane where the seal terminal lies;

wherein the line segment m has a perpendicular bisector that is defined as a first line in the first plane, and a line passing through the first point along a direction perpendicular to the first line is defined as a second line, a third line formed by passing through both the first point and the second point, wherein the first line intersecting the second line at a third point, a straight-line distance from the first point to the third point defined as a first distance H, a straight-line distance from the second point to the third point defined as a second distance L;

the first connector is projected along the direction perpendicular to the first plane to define a first projecting line, wherein the second connector is projected along the direction perpendicular to the first plane to define a second projecting line, and the third connector is projected along the direction perpendicular to the first plane to define a third projecting line; and the first projecting line and the third line form an angle defined as a first angle $\alpha$, wherein $0° \leq \alpha \leq \arctan(H/L)$.

2. The wiring device of claim 1, wherein the second projecting line and the third line form an angle defined as a second angle $\beta$, wherein $0° \beta \leq \arctan(L/H)$.

3. The wiring device of claim 1, wherein the third projecting line and the third line form an angle defined as a third angle $\gamma$, wherein $\arctan(H/L) \leq \gamma \leq \arctan(L/H)$.

4. The wiring device of claim 1, wherein the sheet connectors are metal sheets.

5. The wiring device of claim 1, further comprising a fastener configured to fasten the wiring device to the case.

6. The wiring device of claim 5, wherein the fastener comprises a nut and a screw, which work together to fasten the wiring device to the case.

7. The wiring device of claim 5, wherein a plurality of the fasteners are provided.

8. A compressor comprising a wiring device as defined in claim 1.

* * * * *